Dec. 6, 1955 T. O. PERKINS 2,725,880

INDEX DEVICES

Filed Feb. 11, 1953

Inventor:
Theodore O. Perkins
By Gary, Desmond & Parker
Attys.

United States Patent Office 2,725,880

Patented Dec. 6, 1955

2,725,880

INDEX DEVICES

Theodore O. Perkins, Crozet, Va., assignor to Acme Visible Records, Inc., Chicago, Ill., a corporation of Delaware Application February 11, 1953, Serial No. 336,326

2 Claims. (Cl. 129—16.7)

This invention relates to visible index means for record cards, and particularly to novel signal means therefor.

The signal means of the present invention is particularly adapted for use in combination with conventional holders comprised of a card body or holder having a transparent sheath embracing the lower marginal edge thereof forming a pocket, and hinge means secured to its upper edge whereby the holder may be mounted on a tray with a plurality of like holders in overlapping relation, spaced so that the lower or index portions of adjacent holders and that of their supported index or record cards are visible at the same time. As is also well known, these lower marginal edge index portions are suitably marked or imprinted with indicia and divisions, and in association therewith there is provided movable signal means, generally of contrasting color, engaged in the holder pocket.

The present invention is particularly concerned with signal means for the purpose indicated, but rather than being slidable or movable in a direction parallel to a card edge or longitudinally of the transparent sheath, are locked in position against such movement, and instead are movable or slidable in a direction normal to the card edge; that is, for example, in a direction transversely of the card edge or the embracing sheath.

Although a single signal may be employed, more generally a plurality are provided, one for each station or for each of the index divisions, which may for example be, months, days or other calendar periods, credit ratings, inventory control, space control, and others. When a plurality of signals are employed, they may be conveniently engaged to a unitary continuous backing or support member.

The movable signals of the present invention, whether employed individually or in a group, are as indicated, engaged to a backing or support member which includes means for engagement with the card holder and within the sheath thereof to prevent accidental displacement when record cards are replaced in the holder. The signals are each provided with a recess in the form of an aperture or a downward perforate or imperforate dimple for reception of the point of a pencil or stylus whereby the signal may be moved, i. e., upwardly or downwardly and in reference to the indicia on a card mounted in the holder, the signal means assembly, that is the signal and its backing or support being constructed and arranged so that there is no danger of obliteration or marring of said indicia.

Other objects and advantages, including the details of construction and arrangement of parts, will be apparent from a consideration of the following specification and drawings, wherein.

Figure 1:
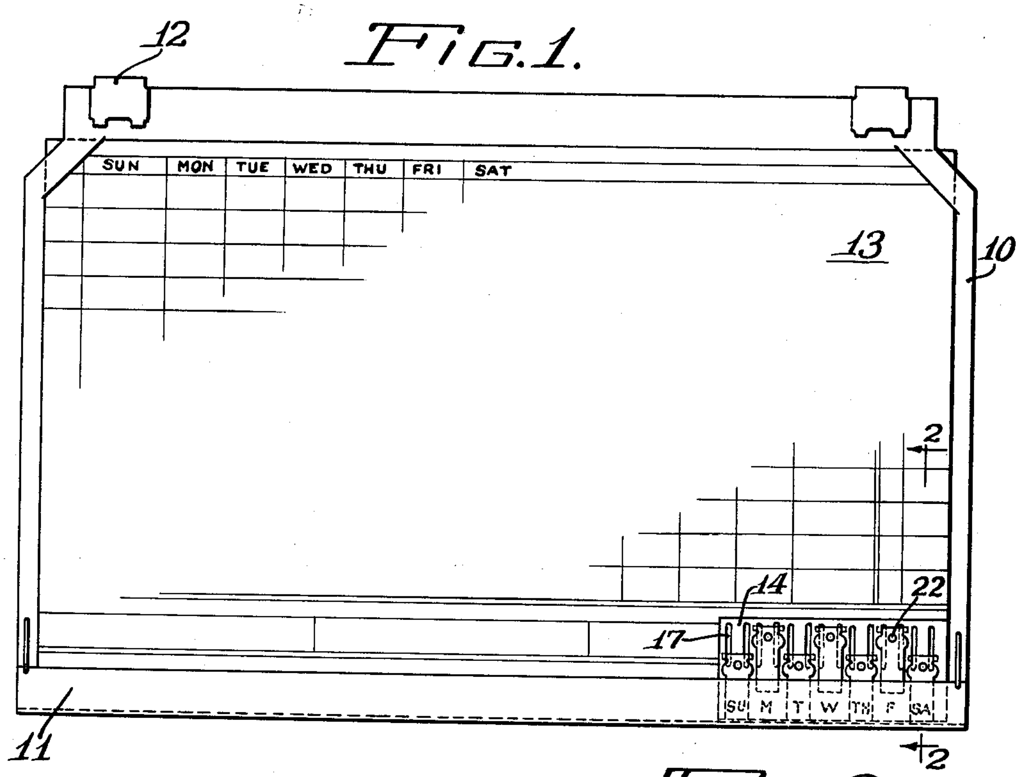
Fig. 1 is a plan view of a record card mounted on a holder, further including the signal means of the present invention in operative association therewith.

Referring to the drawings, Fig. 1 illustrates a conventional holder comprising a card body 10 having a transparent sheath 11 embracing the lower marginal edge thereof forming a pocket, and hinges 12 secured to its upper marginal edge whereby the holder may be mounted on a tray with a plurality of like holders in overlapping relation, spaced so that the lower or index portions of adjacent holders and that of their supported index or record cards 13 are all visible at the same time.

Figure 2:
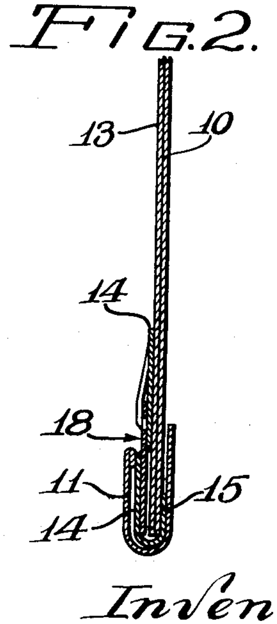
Fig. 2 is a section on the line 2—2 of Fig. 1.
Figure 3:
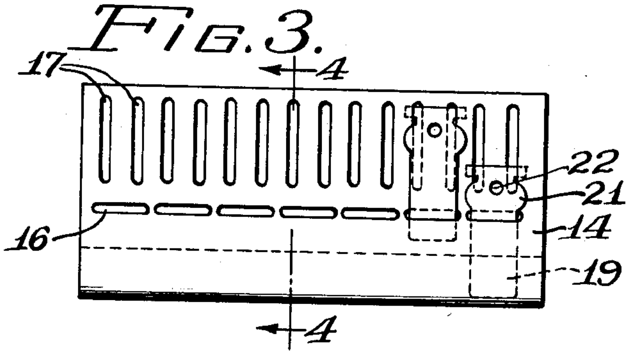
Fig. 3 is an enlarged plan view of the signal means of the present invention.
Figure 4:
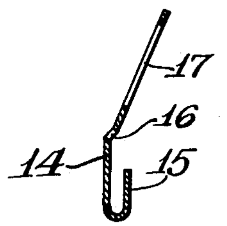
Fig. 4 is a section on the line 4—4 of Fig. 3.
Figure 5:
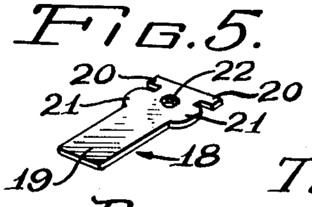
Fig. 5 is a perspective view of the slidable signal shown in the assembly of Figs. 1 and 3.

Figs. 3 to 5 illustrate in detail the signal means associated with the assembly of Fig. 1, and comprises a strip 14 of transparent, preferably flexible material such as cellulose acetate, having a rearwardly return-bent lower-edge portion 15 whereby it may be inserted in the pocket between the sheath 11 and the holder body 10 and embraced over the lower edge of the body 10, as shown in Fig. 2. Thus, after once being engaged to the holder body, the strip 10 is anchored against upward accidental displacement, or displacement in use by replacement of a card 13 in the holder pocket.

The strip 14 may be of any desired length to accommodate one or more slidable signals 18, formed of like flexible material but of one or more contrasting colors. The strip 14 is formed with one or more slots 16 parallel to the folded edge of strip 14, and one or more spaced pairs of slots 17 which extend normal to and above each slot 16. Each group of slots, that is a slot 16 and a pair of slots 17, receives a signal 18 in limited slidable engagement when the shank portion 19 of the signal is inserted in a slot 16 and the opposed lateral projections or wings 20 are inserted in a slot pair 17. For providing better frictional engagement and for preventing undue free sliding, the opposed sides of the shank 19 may be further provided with the opposed lateral projections 21 spaced below the wings 20. The signals 18 are thus held locked in for sliding engagement in a direction normal to an edge of the holder 10 or an edge of a supported record or index card 13. As shown in Fig. 4, the strip 14 is preferably initially bent rearwardly along the line of the slots 16. This aids in assembly by facilitating projection of the shank portion 19 of the signal into a slot 16, and further tends to urge the assembled signal means and the upper edge of strip 14 against the face of a card 13 for better cooperative relationship therewith.

As shown in Fig. 1, the card 13 is positioned on the holder so that its lower edge extends within the transparent sheath 11 and beneath the face of the signal means unit. In the illustration, a portion of the lower marginal edge of the card 13 is marked off into seven divisions and lettered for days of the week, normally visible through sheath 11. Extending over this index section is a signal unit of seven sections for signaling cooperation therewith. Each of the slidable signals 18 is provided with a recess 22 in the form of an aperture or a perforate or imperforate downward dimple adjacent the head or wings 20 adapted to receive the point of a stylus or pencil to effect displacement of the signal in a direction parallel to that of the slots 17 and within the slot limits. In the illustration this direction of movement is upward and downward or transversely of the holder assembly, as distinguished from longitudinal movement as generally conventional with other known slidable signals for indexes of the class illustrated.

It will be particularly noted that the recess 22 is closely adjacent to the head of the generally T-shaped signal 18 and intermediate the width thereof and at all times during operative movement the aperture 22 lies over an imperforate portion of the backing strip 14. This backing thus serves to protect indicia thereunder and prevents possibility of obliteration or marring thereof when moving the signal by means of a pencil or the point of a stylus.

Although I have shown and described the preferred embodiment of my invention, it will be understood by those skilled in the art that various modifications may be made in the details without departing from the spirit and scope thereof as set forth in the following claims.

I claim as my invention:

1. Signal means for association with an edge portion of a card, comprising a base strip of transparent flexible material, the lower edge only of said strip being rearwardly return-bent for reception of said card edge portion, a plurality of slots formed in said strip adjacent and parallel to but spaced from its folded edge, a plurality of pairs of spaced slots formed in said strip with each pair extending normally to and disposed above one of said first mentioned slots, and a plurality of signal strips of contrasting color each including a pair of laterally and oppositely projecting wing portions adjacent their upper end portions, said signal strips overlying said base strip with their lower ends projecting through said first mentioned slots and their wings projecting through said slot pairs, said signal strips being each further formed with a recess adjacent their upper ends cooperative with means for effecting displacement of the signal within the longitudinal limits of the slot pairs.

2. The combination with a visible record device comprising a card holder including a transparent sheath embracing the lower marginal edge portion thereof and a record card embodying an index portion within said sheath, of signal means in association with the lower marginal edge portion of said record card and projected within said sheath comprising a base strip of transparent flexible material, the lower edge only of said strip being rearwardly return-bent for reception of said card edge portion, a plurality of slots formed in said strip adjacent and parallel to but spaced from its folded edge, a plurality of pairs of spaced slots formed in said strip with each pair extending normally to and disposed above one of said first mentioned slots, and a plurality of signal strips of contrasting color each including a pair of laterally and oppositely projecting wing portions adjacent their upper end portions, said signal strips overlying said base strip with their lower ends projecting through said first mentioned slots and their wings projecting through said slot pairs, said signal strips being each further formed with a recess adjacent their upper ends cooperative with means for effecting displacement of the signal within the longitudinal limits of the slot pairs.

References Cited in the file of this patent

UNITED STATES PATENTS

| | | |
|---|---|---|
| 1,645,598 | Johnston | Oct. 18, 1927 |
| 1,912,984 | Jones | June 6, 1933 |
| 2,297,682 | Attwood | Oct. 6, 1942 |

FOREIGN PATENTS

| | | |
|---|---|---|
| 257,630 | Switzerland | Dec. 27, 1946 |
| 275,165 | Switzerland | May 15, 1951 |